Oct. 14, 1924.  
F. M. PIERCE ET AL  
1,511,579  
TIRE WRAPPING MACHINE  
Original Filed April 29, 1920    2 Sheets-Sheet 2
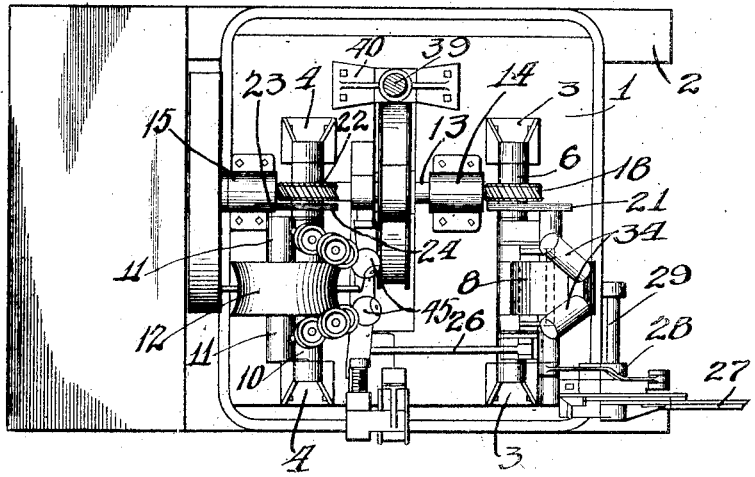
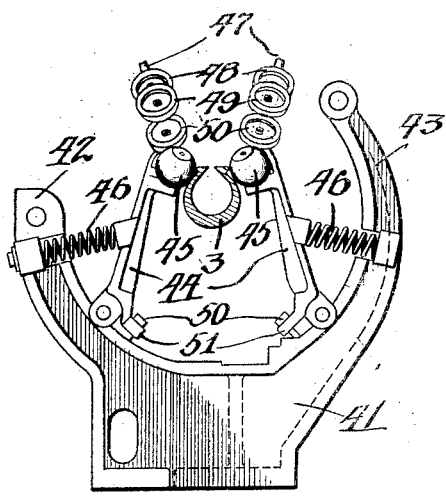
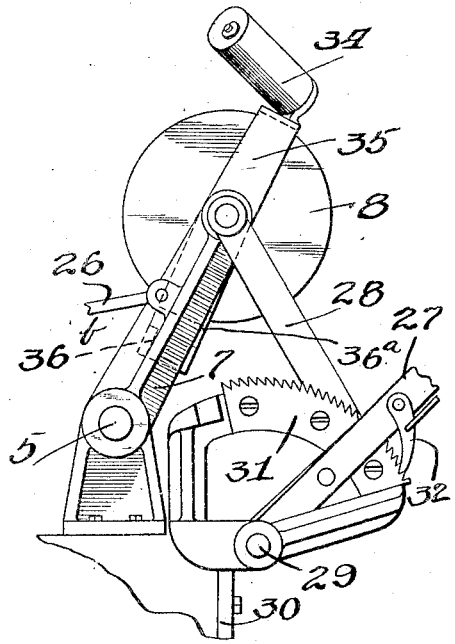
Witnesses
Inventors  
Frank M. Pierce  
Paul Pierce  
William B. Pierce  
by Charles ... Atty Patented Oct. 14, 1924.

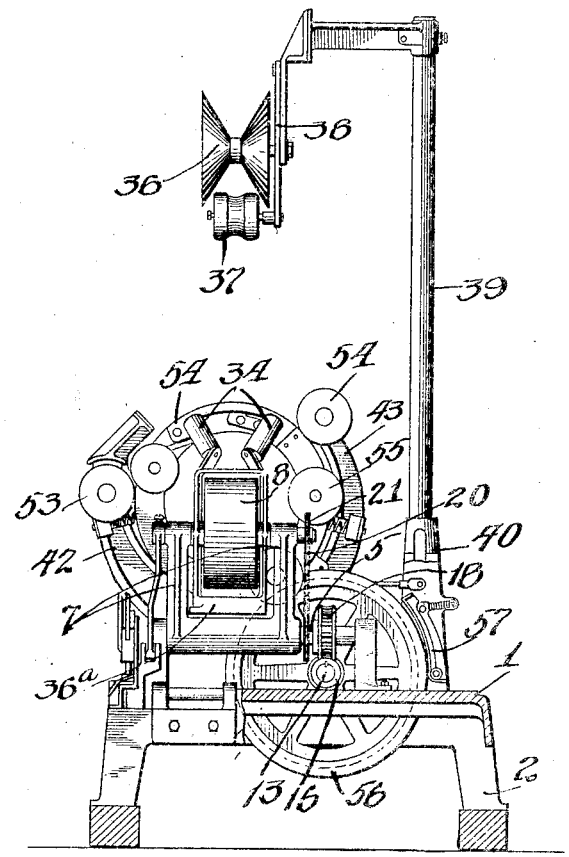

1,511,579

UNITED STATES PATENT OFFICE.

FRANK M. PIERCE, PAUL PIERCE, AND WILLIAM B. PIERCE, OF CHICAGO, ILLINOIS, ASSIGNORS TO PIERCE WRAPPING MACHINE CO., A CORPORATION OF ILLINOIS.

TIRE-WRAPPING MACHINE.

Original application filed April 29, 1920, Serial No. 377,492. Divided and this application filed June 9, 1923. Serial No. 644,432.

*To all whom it may concern:*

Be it known that we, FRANK M. PIERCE, PAUL PIERCE, and WILLIAM B. PIERCE, all citizens of the United States, and residents of the city of Chicago, in the county of Cook and State of Illinois, have invented certain new and useful Improvements in a Tire-Wrapping Machine; and we do hereby declare that the following is a full, clear, and exact description of the same, reference being had to the accompanying drawings, and to the numerals of reference marked thereon, which form a part of this specification.

This invention relates to a tire wrapping machine, the present application comprising a division of our application for patent for a "tire wrapping machine," Serial No. 377,492, which was filed in the United States Patent Office on April 29th, 1920.

In the production of tires for use on automobiles and other vehicles the proper wrapping of the tires for storage and shipment is an important item.

It is therefore an object of this invention to construct a machine adapted to receive a tire adjustably supported therein and engaged through the eye of a shuttle which carries wrapping material carriers so that when the machine is driven the tire is caused to rotate through the eye of the shuttle and likewise the shuttle rotates through and around the tires and a helical wrapper is thus supplied upon the tires.

It is an object of the invention to construct a tire wrapping machine wherein the driving and supporting means for the tires are adjustably mounted to position tires of different size with respect to the shuttle, and having means whereby the convenient adjustment of said driving and supporting means may be easily effected.

It is another object of this invention to provide a tire wrapping machine having guiding and pressing means for guiding the tires when introduced into the machine and for positioning the tire properly therein and pressing the beads of the tire tightly together when the wrapping is applied.

It is a further important object of the invention to construct a tire wrapping machine, the supporting, guiding, and driving means of said machine being conveniently adjustable to properly position tires of different sizes therein, the degree of adjustment of the various supporting means being differentially controlled to insure an offset position of the tires with respect to the shuttle.

It is an important object of this invention to provide a tire wrapping machine embodying automatically adjustable tire guiding means.

It is finally an important object of the invention to provide an improved wrapping machine for annular objects which is provided with a plurality of adjustments and which may be operated efficiently at high speed to apply a durable wrapper.

Other and further important objects of the invention will be apparent from the disclosures in the specification and the accompanying drawings.

The invention (in a preferred form) is illustrated in the drawings and hereinafter more fully described.

On the drawings:

Figure 1 is a central vertical section through a tire wrapping machine embodying the principles of this invention.

Figure 2 is a top plan view of the machine.

Figure 3 is a fragmentary elevation with parts in section illustrating the shuttle frame and bead pressing means.

Figure 4 is a fragmentary enlarged side elevation illustrating certain of the tire supporting and guiding means together with the adjusting means therefor.

As shown on the drawings:

As clearly shown in Figure 1, the machine is mounted upon a flat table 1, and supported at its corners by means of integral legs 2. A pair of bearing brackets 3 are secured on the table 1 at one side thereof with another pair of similar bearing brackets mounted near the other side. Journalled in the bearing brackets 3 is a shaft 5 and a long tubular member 6 having outwardly directed bracket arms 7 is pivotally engaged upon said shaft. Journalled in the upper end of the arms 7 is a roller 8, which, with said pivoted arms as a support, is thus swingingly mounted upon the shaft 5. Similarly in bearing brackets 4 a shaft similar to the shaft 5 is journalled which has engaged thereover a tubular member 10 having integral bracket arms 11 similar to the arms 7 swingingly supporting a concavely grooved roller 12 journalled therebetween.

A main driving shaft 13 is supported on said table 1 in bearings 14 and 15 provided for this purpose and has keyed thereon a worm 16 adjacent the bearing bracket 3 and a similar worm adjacent the bearing bracket 4.

As shown in Figure 1, a small worm gear 18 is secured upon the shaft 5 and meshes with the worm 16, and rigidly connected to said worm gear is a small sprocket wheel 19 which has trained thereabout a sprocket chain 20 which is entrained about the sprocket wheel 21 connected to the shaft of the roller 8. Similarly the grooved roller 12 is driven from the main shaft 13 by a worm gear 22 meshing with one of the worms 16 and having rigidly associated therewith a small sprocket wheel 23, which has trained thereabout, and about a sprocket secured to the shaft of the pulley 12, a driving chain 24.

The bracket arms 11 and 7 which support the respective grooved rollers 8 and 12 are connected for simultaneous adjustment toward and away from one another and yet in a manner to secure a greater displacement of the roller 12 for a given movement of the roller 8. For this purpose a short downwardly directed arm is formed on the under side of the tubular member 10 and is connected by a link 26 to one of the arms 7 of the swinging support for the roller 8. For rocking said arms 7 to adjust the supporting and driving rollers 8 and 12, a lever 27 is provided which is pivotally connected to the upper end of said arm by a link 28.

As clearly shown in Figure 4, the lever 27 is rotatably mounted on a longitudinal shaft 29 which is secured in a bracket 30 bolted to the end of the frame 1. In order that said lever 27 may be locked in adjusted position, a notched segment 31 is provided which is secured on the frame 1 adjacent said lever and which is engaged by a manually releasable pawl 32 pivoted on the lever.

A tire 33 which is being wrapped is rotatably supported on the rollers 8 and 12 and for guiding said tire as it rotates over the roller 8 is a pair of outwardly extending flaring guiding rollers 34 are supported on members 35 pivoted on the axial mounting of the roller 8. Said members 35 are normally held in position relative to the arms 7 by a weighted downward extension 36ª having stops 36ᵇ thereon which engage flanges on the arms 7 limiting the downward and outward travel of said extensions 36ª.

For guiding the upper portion of the tire 33 an upper guide roller 36 and an overrunning follower roller 37, which may be of resilient material, are adjustably supported on a bracket 38 which is secured to a column 39 mounted on a frame 40 bolted or otherwise suitably secured to the table 1.

Means are provided for guiding the tire 33 on to the driving and supporting rollers 8 and 12 and for pressing the beads of said tire inwardly in order that the tire may be more tightly wrapped. A shuttle frame 41 having arms 42 and 43 is secured to the frame 1 between and parallel to the drive shaft of the tire driving and supporting rollers 8 and 12. Pivoted on said frame 41 on the inside of the arms 42 and 43 are a pair of brackets 44 and bead pressing rollers 45 are pivotally mounted on the outer ends of said brackets. Coil springs 46 secured to the arms 42 and 43 and engaging the outside of the arms 44 act normally to press said arms 44 and the bead pressing rollers 45 inwardly as clearly shown in Figure 3.

Extensions 47 are formed on the brackets 44, and pivoted on said extensions are tire guiding rollers 48, 49 and 50 which serve to guide the tire into place upon the supporting and driving rollers 8 and 12.

As shown in Figure 3, the shaft upon which the guiding roller 49 is pivoted is somewhat longer than the shafts for the rollers 48 and 50. In order to limit the inward movement of the arms 44 and the bead pressing rolls 45 pivoted thereon, bolts 50 are adjustably engaged through inwardly extending bosses 51 at the inner ends of said arms 44 and engage the sides of the arms 42 and 43 to limit the inward movement of the upper end of said arms 44.

A shuttle 52 is rotatably supported between the arms 42 and 43 and supporting rollers 53 and 54 and said shuttle carries thereon one or more suitable wrapping material carriers which are indicated by the reference numeral 55. Since the wrapping material carriers and the shuttle in their specific form comprise no part of the present invention, they will not be described in detail herein. It may be noted, however, that the shuttle is driven from the drive shaft 13 through frictional engagement of a large drive wheel 56, the rotation of which is in part controlled by a suitable brake 57.

The operation is as follows:

A tire or other annular article to be wrapped is positioned on the rollers 8 and 12, the beads of the tire being inserted between the bead pressing rollers 45. During the insertion of the tire in the machine, the outwardly flaring members 47 with the rollers 48, 49 and 50 thereon, and also the outwardly flaring members 34 associated with the roller 8, serve to guide the tire into proper position and to facilitate efficient and rapid operation of the machine. The weighted portion 36ª on the arms 35 tends to maintain said arms in alignment with the arms 7. Tires of larger diameter, however, act to push the rollers 34 and the arms 35 outwardly in accordance with the diameter of the tire. After a tire has been properly positioned in the machine and the driving and supporting rollers 8 and 12 have been adjusted by means of the lever 27, a strip of wrapping material from the shuttle is engaged against the tire and the machine is started in operation, whereupon the relative rotation of the tire due to the driving rollers 8 and of the shuttle effects the application of a continuous spiral wrapping of material from the reel 55 on the tire. After the wrapping is completed and secured, the tire is of course removed from the machine and the operation just described is again repeated.

It should be noted that the outwardly flaring guiding means which are provided serve to greatly facilitate the introduction of a tire into the machine and also assist in keeping the tire in proper position relative to the shuttle and to the machine during the process of wrapping thereof.

We are aware that numerous details of construction may be varied through a wide range without departing from the principles of this invention, and we therefore do not purpose limiting the patent granted otherwise than necessitated by the prior art.

We claim as our invention:

1. In a wrapping machine for annular objects, a pair of rollers for supporting and driving an object to be wrapped, and outwardly flaring guiding means adjacent each of the rollers.

2. In a wrapping machine of the class described, a plurality of rotatable means for supporting and rotating an object to be wrapped, and outwardly flaring guiding means adjacent each of said rotatable means, certain of said guiding means being adjustable independently of the supporting means and certain thereof secured to the supporting means.

3. In a wrapping machine for annular articles, means for supporting and rotating an article to be wrapped, pivotally supported guiding means adjacent certain of said supporting means, and means tending to maintain said guiding means in a predetermined position.

4. In a wrapping machine of the class described comprising a wrapping shuttle and rolls at opposite sides thereof for supporting an article in traversing relation thereto, a member adjacent the shuttle carrying a diverging pair of rollers and yieldably supported to be displaced by a tire entering between the rollers.

5. In a wrapping machine for annuli in combination, a circular shuttle to revolve about the annulus, a driven roll adjacent the shuttle engaging the annulus to draw it through the shuttle and a pair of diverging guide members engaging the annulus adjacent the point of wrap and closely in advance of said roll to center the annulus thereon, said members being yieldably supported automatically to adjust themselves to annuli of different sizes.

In testimony whereof, we have hereunto subscribed our names in the presence of two subscribing witnesses.

FRANK M. PIERCE.
PAUL PIERCE.
WILLIAM B. PIERCE.

Witnesses:
E. M. HANSEN,
EMIL STERN.